United States Patent [19]

Seamone

[11] 4,155,535
[45] May 22, 1979

[54] LOW AXIAL FORCE SERVO VALVE SPOOL

[75] Inventor: Woodrow Seamone, Rockville, Md.

[73] Assignee: The Johns Hopkins University, Baltimore, Md.

[21] Appl. No.: 775,937

[22] Filed: Mar. 9, 1977

[51] Int. Cl.² .................. F15B 13/04; F16K 3/26
[52] U.S. Cl. .......................... 251/282; 137/625.3; 137/625.69; 251/324
[58] Field of Search .............. 137/625.3, 625.69; 251/282, 324

[56] References Cited

U.S. PATENT DOCUMENTS

| | | | |
|---|---|---|---|
| 2,747,612 | 5/1956 | Lee | 251/324 |
| 2,971,536 | 2/1961 | Junck et al. | 251/282 |
| 2,987,050 | 6/1961 | Oppenheimer et al. | 137/625.69 X |
| 3,009,480 | 11/1961 | Miller | 251/282 X |
| 3,123,335 | 3/1964 | Darling | 251/282 |
| 3,198,212 | 8/1965 | Junck et al. | 251/282 X |
| 3,525,500 | 8/1970 | Bender | 137/625.69 X |
| 3,729,026 | 4/1973 | Wilke | 251/282 X |
| 3,747,642 | 7/1973 | Tolbert | 127/625.3 X |
| 4,009,864 | 3/1977 | Schexnayder | 137/625.69 X |
| 4,056,126 | 11/1977 | Hauser et al. | 137/625.69 X |

FOREIGN PATENT DOCUMENTS

2261340  6/1974  Fed. Rep. of Germany ............ 251/324

Primary Examiner—Gerald A. Michalsky
Attorney, Agent, or Firm—Robert E. Archibald; Samuel L. Sachs

[57] ABSTRACT

A valve spool characterized by significantly lower flow induced axial force, the force being sufficiently low to render single stage servomechanical valves practical for small and moderately powered servomechanical apparatus. The present valve spool and servomechanical apparatus has a zero force metering edge which results from selection of a slope for the exit portion of the flow contour which is between that of a prior art rectangular port and that of the shallow slope typical of large negative axial force design. The present valve spool is further configured to allow metering across a small portion of the spool circumference in order to increase valve stroke and to minimize spool leakage. Preferably, a wedge is cut on two of the metering spool edges by grinding symmetrical flats across the valve spool edge to form the metering edges, the metering orifice then being defined by the intersection of the insert edge and the valve spool flat. Use of a partial circumferential opening, such as a wedge cut, in combination with a low force flow contour results in a valve spool with long stroke, low axial flow force, negligible leakage, and which can be manufactured with low tolerances.

7 Claims, 21 Drawing Figures

FLOW FORCE SENSITIVITY TO SUPPLY PRESSURE
FULL ANNULUS OPENING, ZERO FORCE PORT

FIG. 7 FLOW FORCE CHARACTERISTICS VERSUS FLOW EXIT ANGLE
ZERO FORCE PORT, TWO 30° WEDGE CUTS

FIG. 8 FLOW FORCE SENSITIVITY TO SUPPLY PRESSURE
ZERO FORCE PORT, TWO 30° WEDGE CUTS

FIG. 9b FLOW FORCE CHARACTERISTICS VERSUS FLOW EXIT ANGLE
ZERO FORCE PORT, TWO 45° WEDGE CUTS

FIG. 9a

FLOW FORCE SENSITIVITY TO SUPPLY PRESSURE
ZERO FORCE PORT, TWO 45° WEDGE CUTS

FIG. 10

FLOW FORCE SENSITIVITY TO SUPPLY PRESSURE
ZERO FORCE PORT, FOUR 30° WEDGE CUTS

FLOW FORCE CHARACTERISTICS
FOUR-WAY VALVE SPOOL, TWO 30 WEDGE
ANGLES ON EXHAUST METERING EDGES

FLOW/DISPLACEMENT CHARACTERISTICS
ZERO FORCE PORT

FIG. 13

FLOW CHARACTERISTICS ACROSS INDIVIDUAL METERING PORTS
FOUR-WAY VALVE SPOOL

FIG. 14

LOAD FLOW VERSUS SPOOL DISPLACEMENT CHARACTERISTICS
FOUR-WAY VALVE SPOOL

FIG. 15

LOW AXIAL FORCE SERVO VALVE SPOOL

STATEMENT OF GOVERNMENT INTEREST

The invention herein described was made in the course of or under a contract or subcontract with the Department of the Navy.

BACKGROUND AND SUMMARY OF THE INVENTION

Since the advent of servomechanical control systems, the hardware components and systems developed for such automatic control systems have become increasingly complex and costly, particularly those components and systems used in guided missiles and aircraft. For example, a common missile electromechanical actuator contains over one hundred-fifty different electromechanical parts, many of which parts require high precision in the manufacture thereof. The cost of such actuation devices is directly related to the required manufacturing precision and parts count. Hydraulic servomechanical apparatus are similarly complex and costly. For example, the commonly used two-stage hydraulic amplifier valve, with its many internal parts and feedback mechanisms, is widely employed in the higher power control range because of its superior performance capability over the simpler and more economical single stage hydraulic valve. The relative complexity and higher cost of the two-stage valve relative to a single stage valve is rarely a deciding factor in the final selection of the servo valve for such systems. Improvement in the performance of less complex and less costly single stage valves, especially as adapted to the performance requirements for missile and aircraft control servos, would constitute a significant advance in the art. The present invention provides such improvement by restructuring of one of the critical servo components, the hydraulic servo valve. The present servo valve is capable of meeting the performance requirements for modern automatic control systems for aircraft and industrial applications while being susceptible to manufacture by low cost production techniques.

The present invention provides a hydraulic valve spool which, when utilized in a servo valve, achieves near zero flow force on a single metering edge without the need for precise machining tolerances. Flow reaction force is typically reduced by a factor of eight to one over conventional valve edge designs, low valve spool reaction forces being attainable within a reasonable range of spool manufacturing tolerances. In particular, the present valve spool in several embodiments thereof is formed with partial circumferential openings, such as can be provided through the use of wedge cuts or other means for reducing valve flow gain, in combination with flow force contouring of the exit portion of the flow contour to produce a zero force or low force edge. Axial forces acting on the present shaped spool are reduced significantly relative to the forces acting on a conventional rectangular land spool. The partial circumferential opening which can be provided inter alia by wedge cuts allows metering across a small portion of the spool circumference in order to increase valve stroke and to minimize leakage. One embodiment of the invention provides a spool with a full annulus opening capable of low force operation over a relatively short valve stroke distance. Essentially then, for a given spool motion dynamic range, spool edge manufacturing tolerances can be reduced through increasing valve stroke.

A preferred manner of achieving an increase of valve stroke according to the invention is the provision of a wedge cut on at least two of the metering spool edges. The wedge cuts can be conveniently formed by grinding symmetrical flats across the valve spool edge to form the metering edges. The metering orifice is thus defined by the intersection of the insert edge and the valve spool flat.

Accordingly, it is an object of the invention to provide an improved spool for a hydraulic servomechanical valve and an improved valve characterized in operation by zero or low force, the improved valve enabling the practical utilization of single stage valves capable of handling moderate power levels.

It is a further object of the invention to provide an improved valve spool for a hydraulic servomechanical valve which is formed with a partial annulus opening on the metering edge thereof and with predetermined geometrical contours on the exit contour thereof.

Further objects and advantages of the invention will become more apparent in light of the following detailed description of the preferred embodiments of the invention.

BRIEF DESCRIPTION OF THE DRAWINGS

FIG. 2b is a graph illustrating a plot of flow force characteristics of the prior art valve of FIG. 2a;

FIG. 3b is a graph illustrating a plot of flow force characteristics of the prior art valve of FIG. 3a;

FIG. 5b is a graph illustrating the flow force characteristics of the full annulus opening, zero force port embodiment of FIG. 5a;

FIG. 6b is a perspective of the valve spool of FIG. 6a;

FIG. 10 is a graph illustrating a plot of flow force sensitivity to supply pressure of the valve spool of FIG. 9a;

FIG. 11b is a graph illustrating a plot of flow force sensitivity to supply pressure of the valve spool of FIG. 11a;

DESCRIPTION OF THE PREFERRED EMBODIMENTS

Prior to an actual description of the preferred embodiments of the present invention, it is believed necessary to briefly discuss certain previous teachings of the prior art in order that the invention can better be understood and appreciated. Accordingly, FIGS. 1–3b relate to the state of the art at the time the present invention was made.

The choice of a hydraulic servomechanical valve for a given application depends to a large degree on the power level which is to be controlled. For low power levels, a single stage spool type valve driven by a torque motor or pair of solenoids is typically adequate. As power levels are increased to one or more horsepower, the performance of a single stage valve becomes marginal due to higher spool flow forces associated with higher power levels, relatively large torque motors or solenoids being thereby required to furnish the necessary stroking forces. In such applications, a two-stage hydraulic amplifier type servo valve is usually selected in order that high spool reaction forces can be overcome by the high differential force levels available from the hydraulic amplifier. A more complex valve thus results. However, the more complex valve not only meets system requirements but usually has far more performance capability than required for the job. A conventional square edged spool valve exhibits a steady stage flow force which is a function of the flow rate, the square root of the pressure drop across the metering edge, and the discharge angle of the vena contracta. For a conventional valve spool design operating at 3000 psi, approximately 0.6 lb of spool reaction force must be overcome per horsepower output. Since typical servos operate in the power range of 1 to 20 horsepower, a significant force of up to 12 lbs may be required in order to move the spool to control flow to the actuator.

Figure 1:
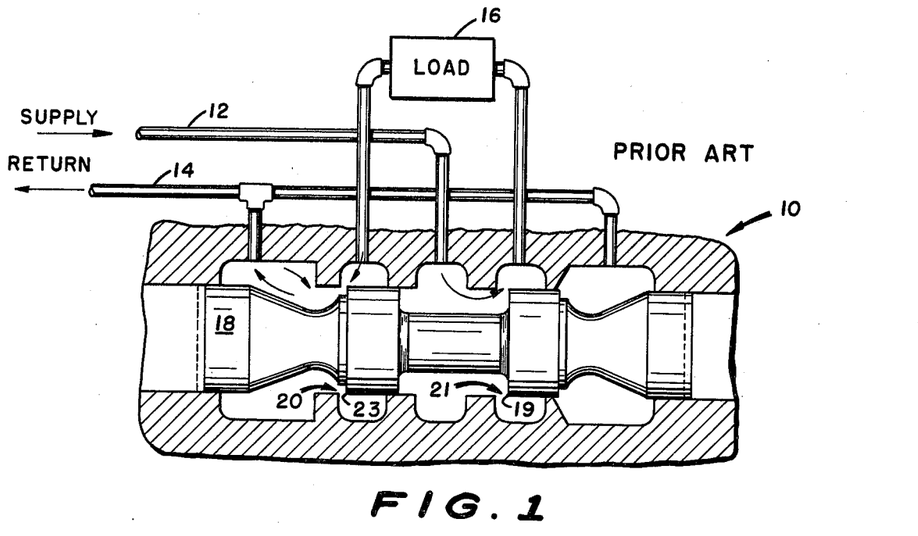
FIG. 1 is an idealized elevational view in partial section of a prior art four-way hydraulic valve which illustrates a prior attempt to achieve force compensation.
Figure 3A:
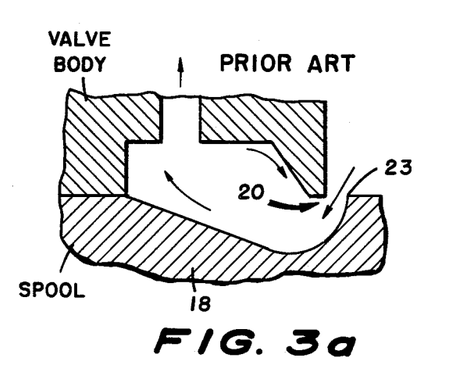
FIG. 3a is a detail elevational view in section of a prior art negative-force port compensated valve edge.
Figure 3B:
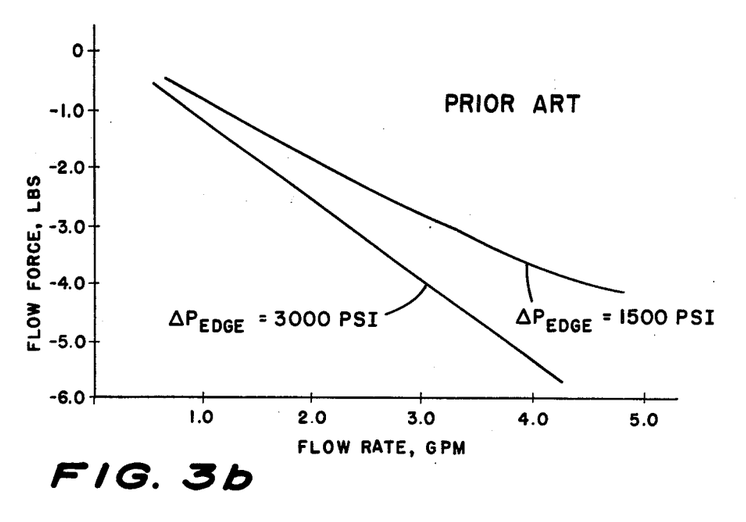

Many conventional valve spools utilize a square metering edge to control the flow to and from the actuator ports. The spool flow metering orifice is formed by the edge of the valve spool and the corresponding edge of the valve insert. Flow occurs symmetrically around the complete circumference of the spool and gives rise to the positive axial closing force on the spool. One early study aimed at minimizing this force was reported by Lee and Blackburn in 1952. These researchers, in combined analytical and experimental studies, developed a negative flow force contour for the valve spool return edge in series with the positive flow induced force on the pressure control edge to result in a near zero net force on the spool. The spool configuration which evolved from this study and achieved a net zero flow force is shown in FIG. 1. The valve 10 of FIG. 1 is a single-stage valve having the usual fluid supply and return conduits 12 and 14 and a load 16 against which the valve works. The valve 10 comprises a valve spool 18 having a positive force metering edge 19 which confronts and partially defines port 21 and a negative force metering edge 23 which defines port 20, the edges 19 and 23 (thus the ports 21 and 20) being in series in an effort to produce a zero net force. A detail view of the return flow edge port 20 of the spool 18 is seen in FIG. 3a, the arrows illustrating entrance of the hydraulic fluid into contact with the contoured spool. The flow of the fluid is thus caused to follow the contours of the spool 18, the contours of said spool being chosen to produce a desired force compensation. As can be seen in FIG. 3b, a typical spool axial force curve for the port 20 of the spool 18 is shown. The manufacture of a significant number of valve spools similar to the spool 18 was never achieved due to the extremely rigid manufacturing tolerances required to successfully produce such spools and due to non-linearities of flow forces which result in the structure.

Figure 2A:
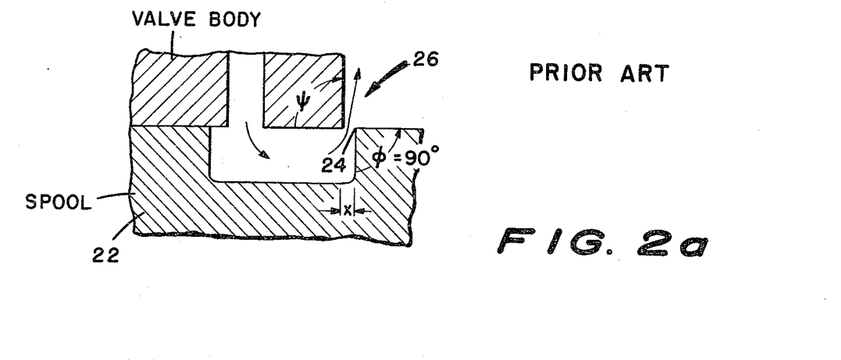
FIG. 2a is a detail elevational view in section of a prior art square-land chamber valve spool and valve.
Figure 2B:
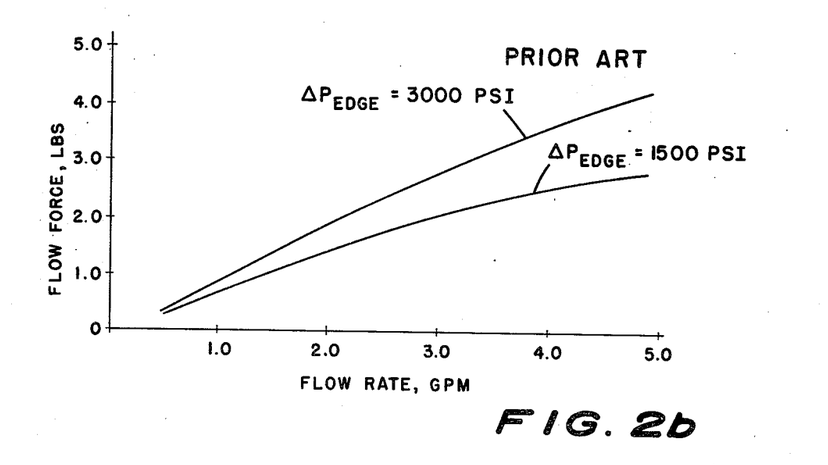

The more conventional "square-land" servo spool 22 is seen in FIG. 2a, a rectangular metering edge 24 of the spool 22 controlling flow to and from an actuator port 26. The port 26 corresponding to the port 21 of FIG. 1. The spool flow metering opening is formed by the cylindrical edge of the valve insert which uncovers the cylindrical shape of the spool 22. As seen in FIG. 2b, the spool 22 is acted upon by positive axial closing forces. The rectangular port valve spool arrangement of FIG. 2a is a widely used structure. However, this structure is subject to significant leakage around valve null, high flow reaction forces which require large forces to operate the spool 22, and criticality of alignment of spool-to-insert metering edges.

Prior efforts to apply the structures of FIGS. 1 and 2a to practical single stage servo valves have not produced a useable structure at moderate power levels. The concept underlying the valve 10 of FIG. 1 attempts to match a large negative force induced on the contoured return edge of the spool 18 with the large positive flow force on a conventional square edged pressure control edge. This "balancing" concept has not proven practical due to the extreme difficulty and high cost of manufacture of such a structure. The present invention provides a spool structure which is similar in certain respects to the spools 18 and 22 and which can be practically and economically produced with a zero force contour which is relatively insensitive to manufacturing tolerances. The present invention can provide a single stage servo valve having a factor of 8 to 1 reduction in spool axial force over the equivalent square edged valve spool 22 of FIG. 2a, the reduction occurring over a wide pressure operating range without valve instability. The invention provides valve spools having a full annulus opening or partial annulus openings for flow metering. The spools with full annulus openings are primarily useful for short stroke valve applications while the spools with partial annulus openings are useful for valves having longer strokes, the partial annulus opening spools being particularly suitable for single stage valves. While the invention will be particularly described hereinafter as utilizing a wedge cut to achieve a partial annulus opening, it is to be understood that a variety of other means can be employed to produce a partial annulus opening, suitable techniques being common in the art. As examples, rectangular slots can be broached in the valve insert body, flat cuts can be made, and broached metering ports can be provided. However, since wedge cuts can simply and economically be made by grinding symmetrical flats across the valve spool edge to form the metering edges, the several embodiments of the invention which have partial annulus openings are shown as having wedge cuts.

Figure 4:
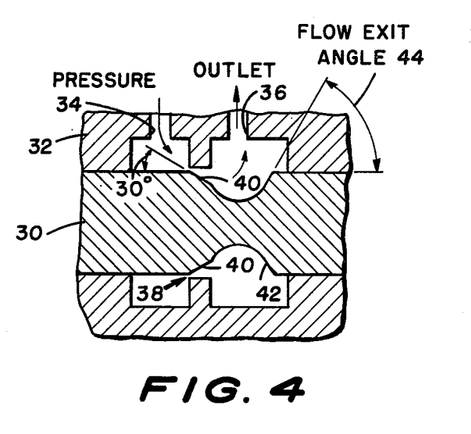
FIG. 4 is an elevational view in partial section of a portion of one embodiment of the present invention, the present valve spool being shown in a single-stage valve structure and illustrating a partial annulus opening on the metering edge of the spool.

Referring now to FIG. 4, a generalized example of the invention utilizing a partial annulus opening can be seen. A spool 30 is seen to be received within a valve housing 32 having a fluid supply inlet 34 and outlet 36, the housing 32 and fluid supply system being configured according to common prior art teachings. The spool 30 is configured to have a partial annulus opening about circumferential metering edge 38, the partial annulus opening being typically provided by wedge cuts 40 which, in this example, are spaced 180° apart. The spool 30 is further formed with a near zero force port contour at 42, the contour 42 being selected within a range of angular values to form a desired flow exit angle 44, the angle 44 being that angle included between the intersection of the line defined by the body of the spool 30 and the extended slope of the contour 42. The contour 42 can be formed to provide ranges of angular values for the flow exit angle 44 as will be further described hereinafter. Use of a partial annulus opening as provided by the wedge cuts 40 allows achievement of a near zero force port as well as low null leakage in a long stroke valve. While the wedge cuts 40 are shown in FIG. 4 to be 30° cuts, a range of angular values for the cuts 40 can be utilized as will be further described hereinafter.

Figure 6A:
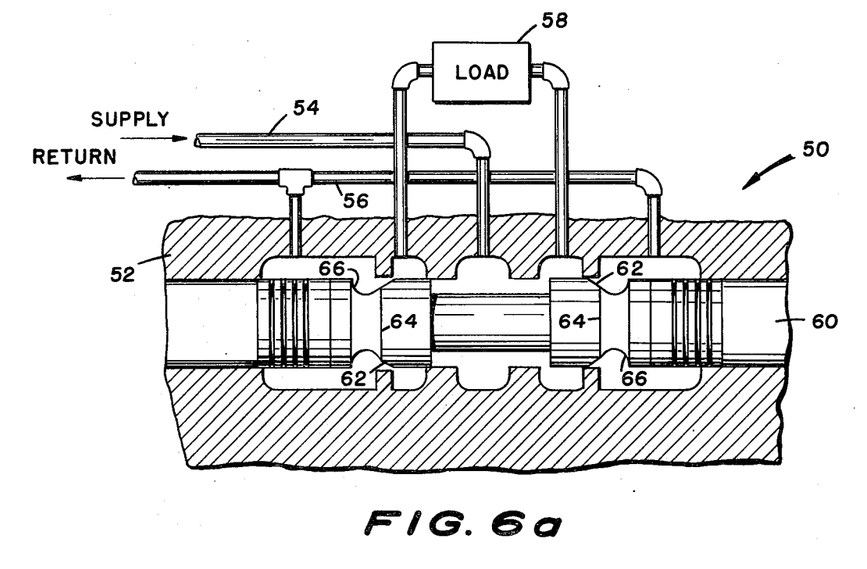
FIG. 6a is an idealized elevational view in partial section of a single-stage hydraulic servomechanical valve according to the invention, wherein the valve spool is configured to have a partial annulus opening and a zero force port.
Figure 6B:
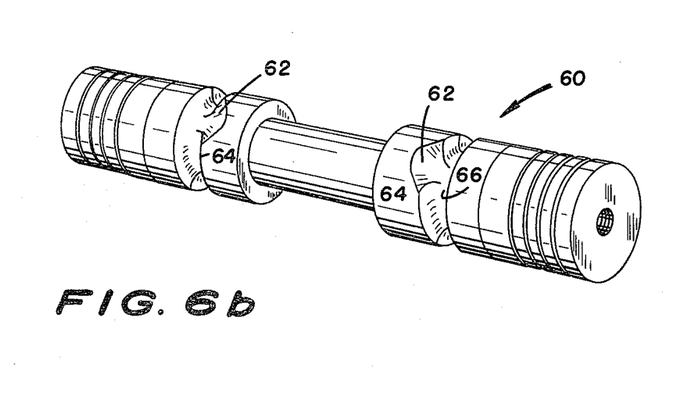
Figure 9A:
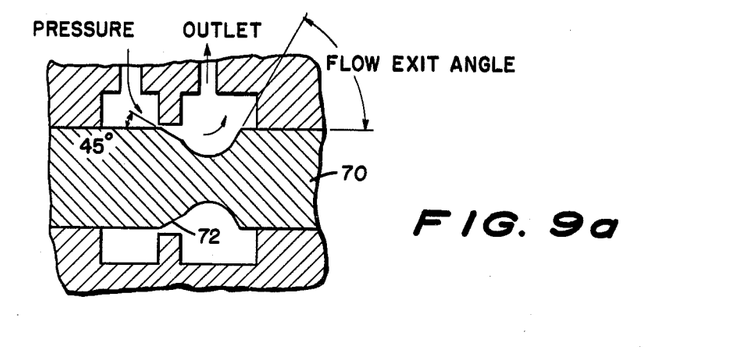
FIG. 9a is a detail elevational view in partial section of a further embodiment of the invention.

A typical single stage valve according to the invention is seen in FIG. 6a at 50 while a spool 60 configured according to the invention is shown also in FIG. 6b. The spool 60 of FIG. 6b is a typical spool which can be used in the valve 50 of FIG. 6a. The valve 50 of FIG. 6a comprises a valve housing 52 and fluid supply and return conduits 54 and 56 respectively, the valve arrangement working against a load 58 in a well-known fashion. The spool 60 is seen to be formed with wedge cuts 62 on circumferential metering edges 64. The spool 60 is further formed according to the teachings of FIG. 4 to have contours 66 which produce a desired flow exit angle to provide an essentially zero force port. The spool 60 is seen to have 30° wedge cuts 62 in a manner similar to the 30° wedge cuts 40 of FIG. 4. The wedge cuts could vary as is illustrated in FIG. 9a, wedge cuts 72 in spool 70 having angles at 45°. The angles of the wedge cuts utilizable in the invention can vary at least between 25° and 55°, other angles being possible. Angles of 30° and 45° have performances indicated in graphic form herein, these graphs to be described hereinafter.

Figure 7:
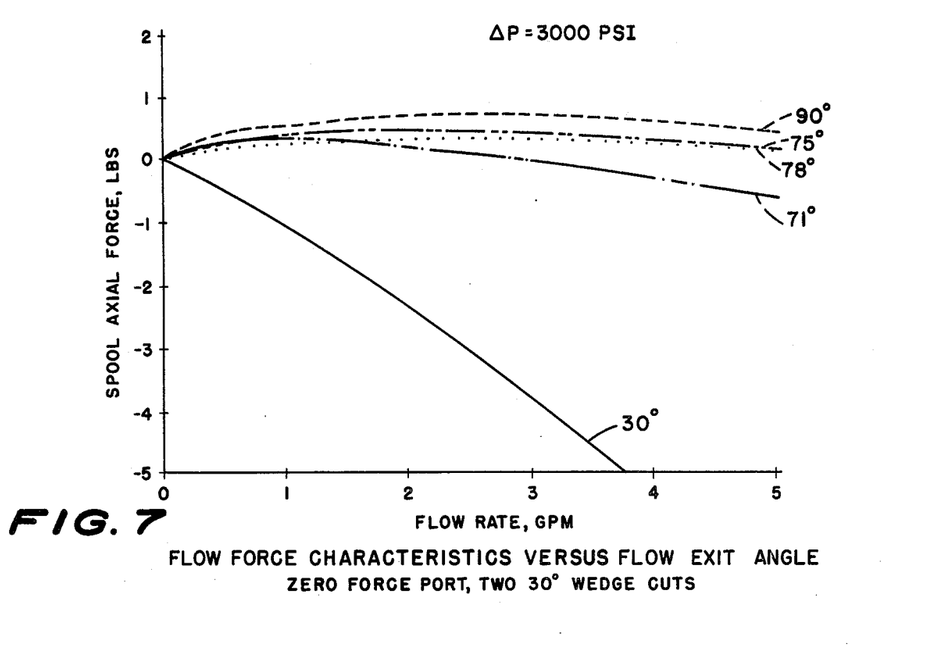
FIG. 7 is a graph illustrating a plot of the flow force characteristics of valve spools having partial annulus openings and flow exit angles of varying arcs.
Figure 8:
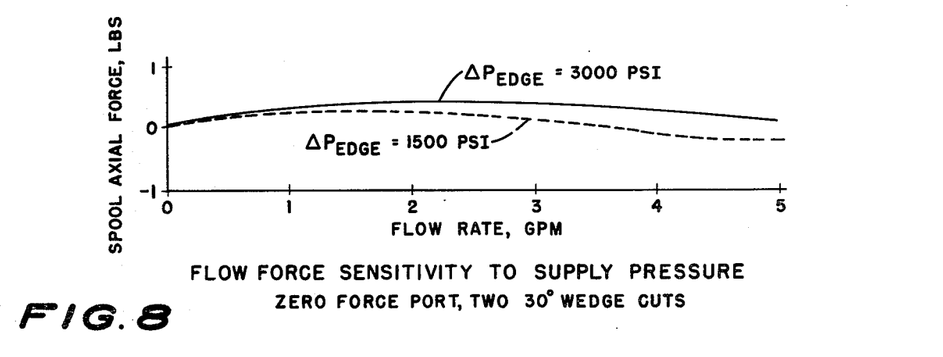
FIG. 8 is a graph illustrating a plot of flow force sensitivity to supply pressure of a partial annulus opening, zero force port valve formed according to the invention.

Valve spools according to the invention and configured with two diametrically spaced 30° wedge cuts on metering edges according to the teachings of FIG. 4 have the flow force characteristics shown in FIG. 7, the flow exit angles 44 being varied between 30° and 90°. Flow exit angles 44 between 71° and 90° result in flow forces of less than ±0.75 pound. FIG. 8 illustrates the sensitivity of flow force to supply pressure of the valve spools so configured, pressure drop being varied from 1500 psi to 3000 psi across the metering edge and resulting in negligible force variation. The data presented in FIGS. 7 and 8 illustrate that an essentially zero force port is formed by the teachings of the invention. The structure so provided is reproducible and is free of valve instabilities.

Figure 9B:
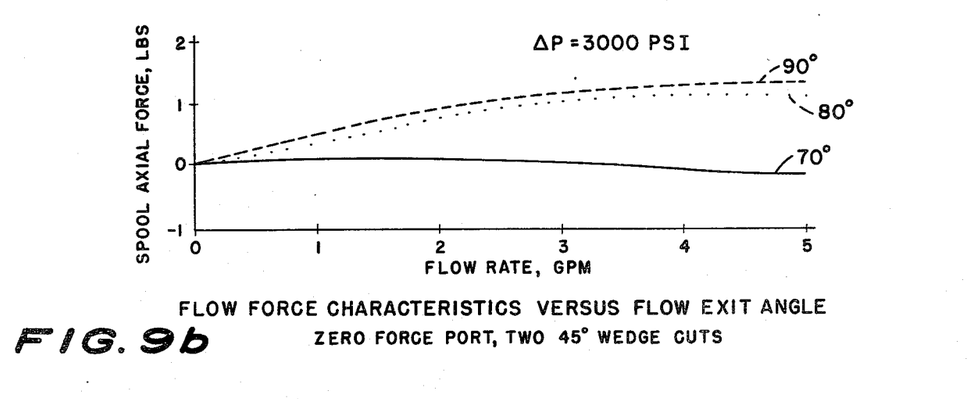
FIG. 9b is a graph illustrating a plot of the flow force characteristics of valve spools having partial annulus openings according to FIG. 9a and flow exit angles of varying arcs.
Figure 10:
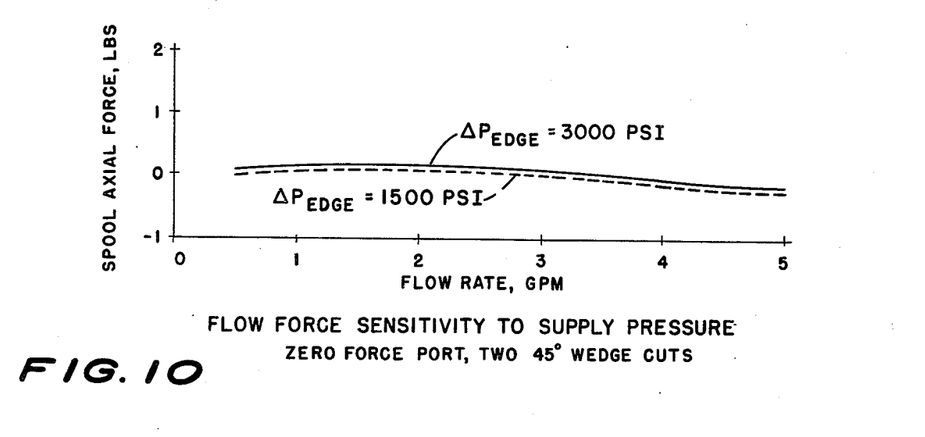

FIG. 9b illustrates the flow force characteristics of valve spools configured according to the spool 70 of FIG. 9a. Two 45° wedge cuts spaced 180° apart on circumferential metering edges are provided, the flow exit angle being varied between 70° and 90°. The spools so configured have less flow force compensation for flow exit angles between 80° and 90° and have an extremely small maximum flow force (<0.2 pound) for the 70° exit angle. FIG. 10 illustrates the minimal variation in sensitivity of the valve of FIG. 9a to supply pressure, the plot showing data for 1500 psi and 3000 psi supply pressure. Data for 500, 1000, and 2000 psi pressures fall within the same range.

Figure 11A:
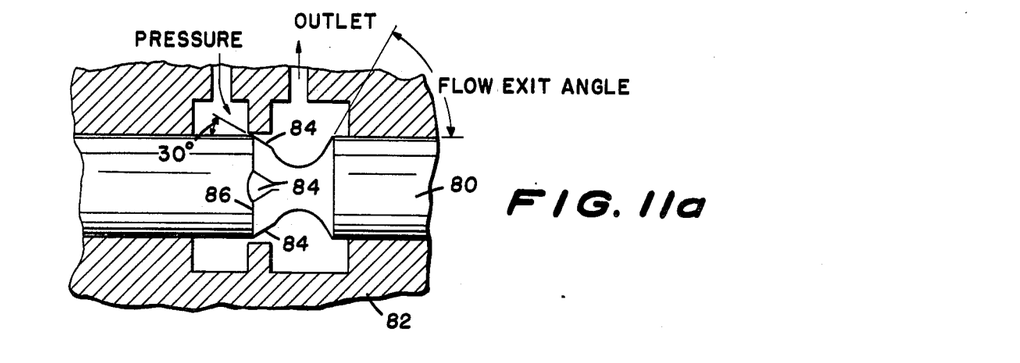
FIG. 11a is a detail elevational view in partial section of another embodiment of the invention.
Figure 11B:
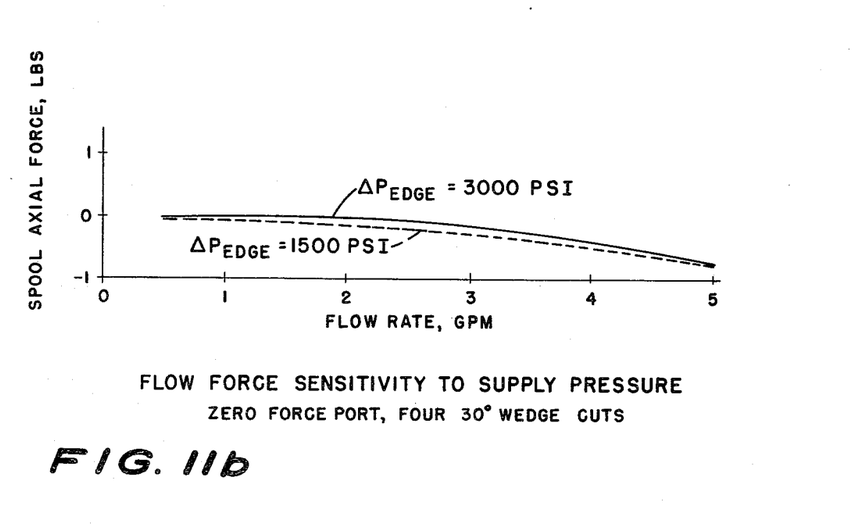

FIG. 11a shows a spool 80 in a valve housing 82, the spool 80 being formed with four 30° wedge cuts 84 spaced 90° apart about circumferential metering edge 86. FIG. 11b illustrates the sensitivity to flow force of the valve of FIG. 11a when subjected to supply pressures of 1500 psi and 3000 psi. The maximum force for this valve is slightly less than 0.15 pound.

Figure 12:
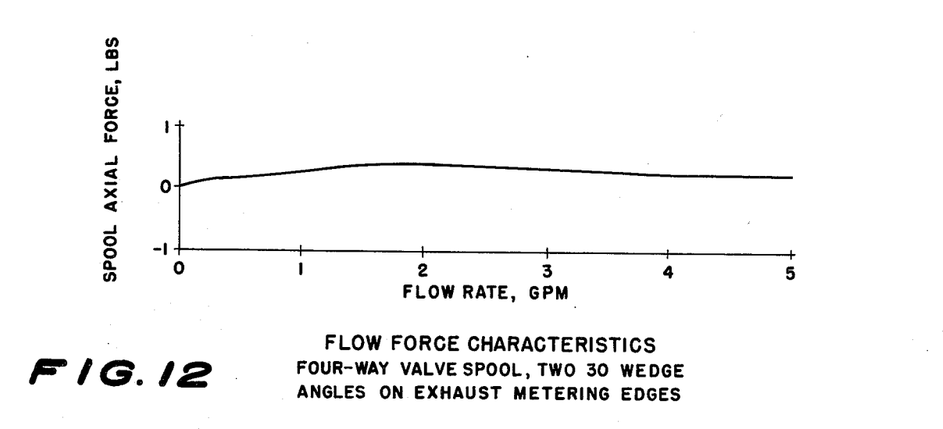
FIG. 12 is a graph illustrating a plot of the flow force characteristics of a four-way valve spool formed according to the invention having two 30° wedge cuts on the exhaust metering edges thereof.

FIG. 12 illustrates the total axial force characteristics for a complete four-way valve, such as shown in FIGS. 6a and 6b, configured similarly to the valve of FIG. 11a, but with two 30° wedge cuts rather than four. The total force of this valve is seen to fall in the same low force range as does the previously described valves. The valve has no valve instabilities and has the flow characteristics shown in FIG. 14 and the flow/displacement characteristics shown in FIG. 15 as will be described further hereinafter.

In addition to the flow reaction force considerations discussed above, important consideration is that of manufacturing and maintaining valve precision edges with negligible leakage. This consideration is particularly significant for hydraulic systems whose operating pressures are projected to increase from the present 3000–4000 psi operating range to 6000–9000 psi. One technique known to minimize leakage and reduce manufacturing tolerances on valve spool and insert edges is to configure the valve porting to increase the operating stroke of the valve spool, this being accomplished by restricting the flow to a portion of the spool circumference rather than the full circumference. Increase of valve stroke by a factor of 2 to 5 may be accomplished in this manner. Some of the manufacturing techniques which have been utilized in the past include broaching of control slots in the insert, drilling a series of small holes in the insert, and specially configured spools to provide a partial opening.

Figure 13:
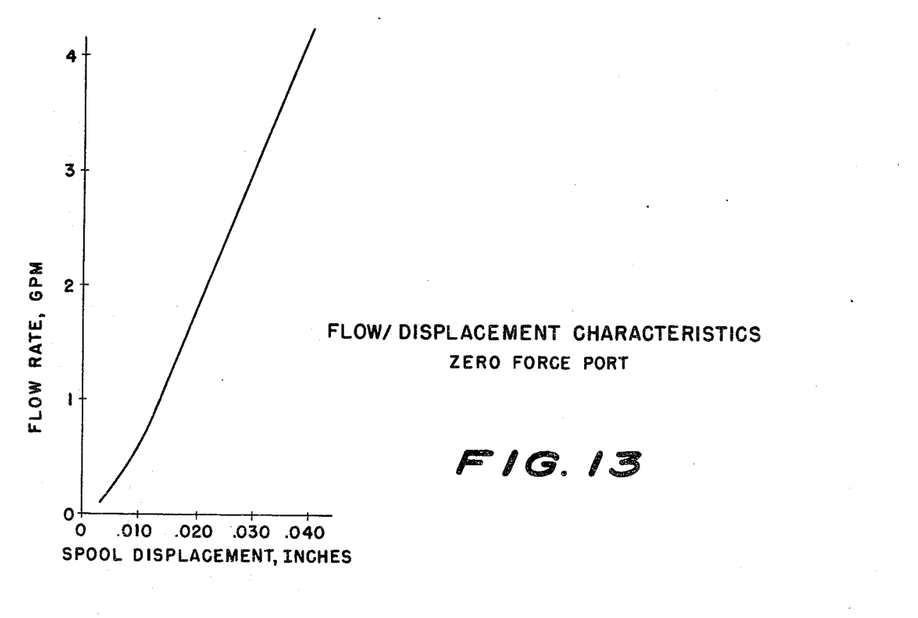
FIG. 13 is a graph illustrating a plot of the flow/displacement characteristics of a zero force port valve spool formed according to the invention.

In the majority of the present structures, spool edge contouring is used to channel flow over a portion of the valve spool circumference. As described previously, the simplest method to achieve this partial annulus opening is the use of a wedge cut across the metering edges of the spool. Although such wedge cuts are easy to machine, it would be believed by one skilled in the art that the three-dimensional geometry of the metering edge formed by the intersection of the spool wedge cut and the insert full annulus edge would be highly nonlinear. The spool displacement-flow data shown in FIG. 13 taken on the spool 30 of FIG. 4 with wedge cuts indicates that the nonlinearity is small and is acceptable for most servo systems. Combining the wedge cut and the zero-force compensation contour, as described above, results in a spool edge configuration with low flow reaction forces as well as low spool null leakage. The wedge cut in the present spools increases the full stroke of valve spool to approximately 0.040 inch as compared to 0.010 inch for a nominal valve.

Figure 14:
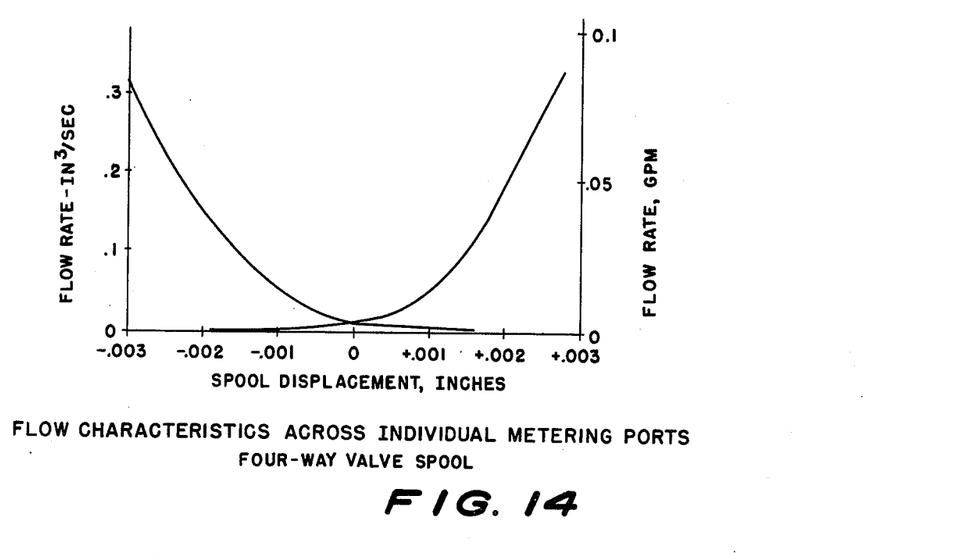
FIG. 14 is a graph illustrating a plot of the flow force characteristics across individual metering edges of a four-way valve spool formed according to the invention; and, FIG. 15 is a graph illustrating a plot of the load flow versus displacement characteristics of a four-way valve spool formed according to the invention.
Figure 15:
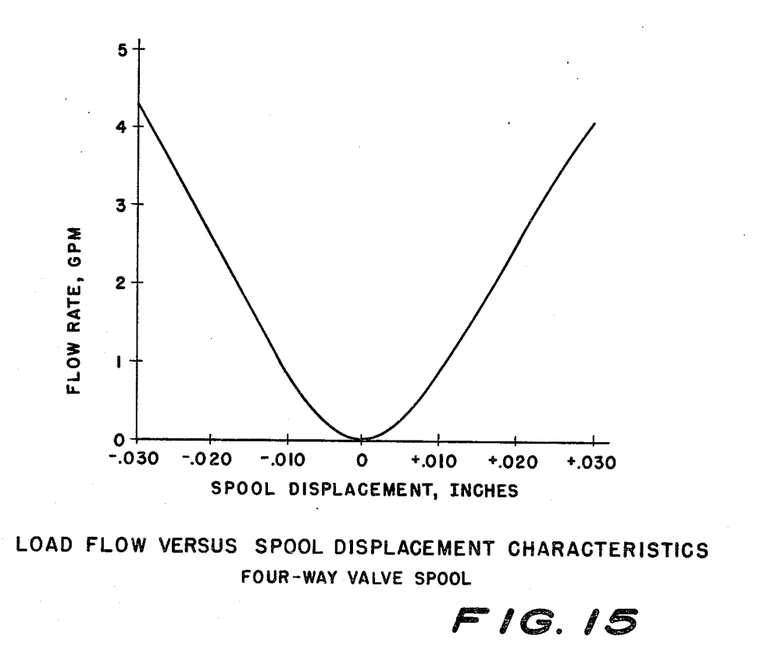

In an effort to quantify the leakage characteristics of the embodiments of the present valve spools, one valve spool was configured as aforesaid as a complete four-way valve with two 30° wedge cuts as mentioned relative to FIGS. 12, 14 and 15. The two edges adjacent to the pressure input port were of the full annulus opening design with the pressure drop controlling edges located in the return circuit of the valve, thereby providing control of the actuator similar to that of a three-way servo valve. During valving, one side of the actuator is connected to the pressure supply line with minimal pressure drop, due to the rectangular edge, while the partial annulus return orifice controls the flow rate. The flow versus spool displacement characteristics were measured for each of the return control edges independently and these data are given in FIG. 14 for the region ±0.003 inch around the null position. Finally, the valve was connected as a four-way valve and the net flow to the actuator was measured. This data is given in FIG. 15. The net leakage flow was found to be 0.02 in$^3$/sec., or approximately 0.1% of full flow range. This leakage value is approximately a factor of ten below that for a typical hydraulic amplifier type valve of the same flow capacity. These data verify the anticipated low leakage characteristics of the embodiments of the invention.

Figure 5A:
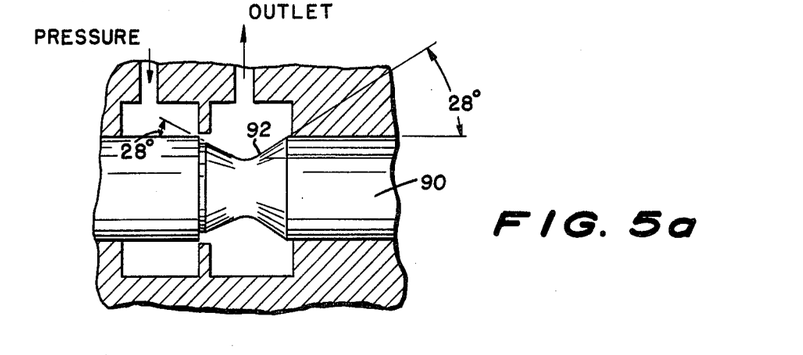
FIG. 5a is an elevational view in partial section of a portion of a second embodiment of the invention, a relatively shorter valve stroke spool having a full annulus opening being shown.
Figure 5B:
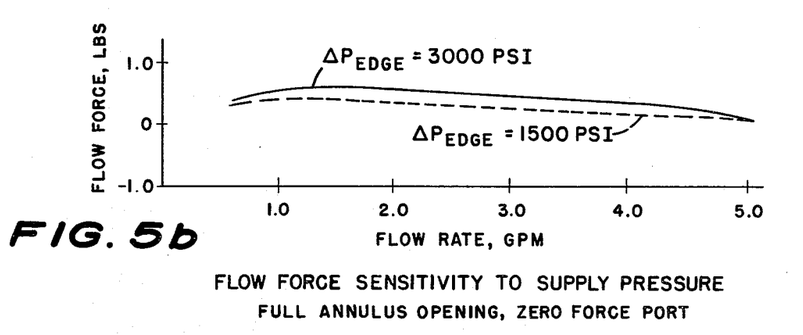

Referring now to FIG. 5a, a spool 90 is shown to have a full annulus opening on the metering edges thereof. As seen in the drawing, a contour 92 which achieves a near zero flow force has a symmetrical design utilizing a 28° angle from the horizontal axis of the spool 90 for both entry and exit flow. The reduction in flow force achieved by the spool 90 is shown in FIG. 5b. Although this embodiment of the invention achieves a desired low spool flow reaction force, undesirable null edge leakage and edge tolerances characterize the structure, thereby causing said spool 90 to be useful primarily for short stroke valve applications. For most short stroke applications, the angle of the contour 92 can range between 25° and 30°.

The present invention provides hydraulic servomechanical apparatus wherein steady state flow forces and null leakage are reduced. The various embodiments of the invention were subjected to testing to provide a measurement of spool axial force, flow rate and valve spool displacement. The valve spool/insert assemblies of the invention were tested to permit flow across a single metering edge of the valve. To minimize the effect of spool/sleeve friction on the test data, the spools were rotated at 500 to 1000 rpm by means of a slip coupling to a hydraulic rotary motor, the rotation resulting in a hydrodynamic bearing supporting the spools. A differential screw was utilized to smoothly move the spools to allow time continuous data measurement of force, flow, and spool displacement to be recorded on an x-y plotter. The driving mechanism was spring loaded against the spools in order to avoid backlash effect, the preload being reduced to zero prior to certain tests in order to check for valve spool instabilities. Exciting the spool with a small axial force under these conditions did not result in valve instabilities at any operating pressure to 3000 psi.

It is to be understood that the invention can be practiced other than as specifically shown and described herein. For example, the angles of the wedge cuts and of the flow contours can vary within ranges especially since the primary teaching of the invention is that a combination of a chosen annulus opening, particularly a partial annulus opening, on the metering edge, with flow force contouring allows economical manufacture of a spool which renders practical single stage servo values for a number of applications wherein only two-stage valves could previously be used. The invention is therefore to be limited only by the scope of the appended claims.

What is claimed is:

1. In a hydraulic valve having a valve housing defining a valve chamber, said housing to be connected to a source of fluid under pressure for transmission of said fluid to a valve outlet defined by said housing, a seat formed by said housing, a valve spool mounted for movement in said housing, said spool having a mating annular seat sealing against the housing seat, transmission of said fluid producing an axial force on said spool definable as a force vector, the improvement residing in that the valve spool has partial annulus openings on flow metering edges thereof to partially reduce the axial force on said spool, and shaped geometrical contours disposed in said valve spool for defining return flow edges thereof, said geometrical contours extending axially forward of said metering edges relative to the flow of said fluid, said geometrical contours configured to alter the force vector of said fluid on said spool, said annulus openings and said contours producing a substantially zero force port between the housing seat and the mating annular seat, the port being relatively free of fluid leakage.

2. The valve of claim 1 wherein the partial annulus openings comprise wedge cuts formed in the flow metering edges of the spool.

3. The valve of claim 2 wherein the plane of the wedge cuts are formed at an angle with respect to the extended exterior surface of the spool, the angle of the wedge cuts being predetermined from the range of 25° to 55°.

4. The valve of claim 3 wherein the shaped geometrical contour defines a return flow edge which forms a flow exit angle which lies in the range of 60° to 85°.

5. The valve of claim 4 wherein the wedge cuts are diametrically oppositely disposed on the flow metering edge and form an angle of 30°, the flow exit angle lying in the range of 70° to 80°.

6. The valve of claim 4 wherein the wedge cuts are diametrically oppositely disposed on the flow metering edges and form an angle of 45°, the flow exit angle lying in the range of 60° to 75°.

7. The valve of claim 1 wherein the shaped geometrical contour defines a return flow edge which forms a flow exit angle which is predetermined and lies in the range of 60° to 85°.

* * * * *